United States Patent [19]

Brown

[11] Patent Number: 4,530,630
[45] Date of Patent: Jul. 23, 1985

[54] EXPANDING ANCHOR FASTENER

[76] Inventor: Russell L. Brown, 6449 N. Grandmark Dr., Oklahoma City, Okla. 73116

[21] Appl. No.: 398,083

[22] Filed: Jul. 14, 1982

[51] Int. Cl.³ .............................................. F16B 13/04
[52] U.S. Cl. .................................................... 411/340
[58] Field of Search ................. 411/15, 34, 38, 182, 411/340, 341, 342, 343, 344, 345, 346, 508

[56] References Cited

U.S. PATENT DOCUMENTS

| | | | |
|---|---|---|---|
| 1,301,558 | 4/1919 | Grgec | 411/342 |
| 1,370,319 | 3/1921 | Kennedy | 411/341 |
| 1,939,983 | 12/1933 | Karitzky | 411/346 |
| 2,236,079 | 3/1941 | Wipper | 411/38 |
| 2,682,190 | 6/1954 | Snyder | 411/346 |
| 3,170,061 | 2/1965 | Vaughn | 411/341 |
| 3,241,420 | 3/1966 | Passer | 411/346 |
| 3,403,594 | 10/1968 | Newell | 411/344 |
| 3,532,024 | 10/1970 | Gutshall | 411/38 |
| 3,917,206 | 11/1975 | Fisher | 411/15 |
| 4,009,634 | 3/1977 | Barmore | 411/340 |
| 4,086,840 | 5/1978 | Kurlander | 411/34 |
| 4,245,545 | 1/1981 | Freeman | 411/342 |
| 4,397,595 | 8/1983 | Smith et al. | 411/34 X |

FOREIGN PATENT DOCUMENTS 38137  1/1915  Sweden ............................... 411/342

*Primary Examiner*—Thomas J. Holko
*Attorney, Agent, or Firm*—Christopher H. Morgan

[57] ABSTRACT

This expansion anchor consists of a cylindrical body having an axial bore therethrough and first and second axial ends. A wing support member extends from the first end of the cylindrical body and generally has a central cylindrical section shape. The wing support member has first and second opposed planar surfaces extending parallel to a central bore which is co-axial to and extends the axial bore in the cylindrical body. The first and second opposed planar surfaces of the wing support member join perpendicularly with the first axial end of the cylindrical body to form first and second recessed shoulder spaces, respectively, therewith. Formed as a part of the unitary plastic anchor are first and second expanding wing elements. These wing elements have a planar engagement surface which are hingedly connected to the wing support member along the planar surface of the wing support member such that the wing elements are movable from a collapsed, axial position to an open, radial position. The first and second expanding wing elements have shoulders disposed for being received in the recessed shoulder spaces when the first and second expansion wing elements are in their open position. In this manner, the first and second expanding wing elements are supported against axial movement beyond the open radial position by the first radial surface of the wing support element and by the first axial end of the cylindrical body.

9 Claims, 5 Drawing Figures

EXPANDING ANCHOR FASTENER

BACKGROUND OF THE INVENTION

1. Field of the Invention

This invention relates generally to fasteners and more particularly to expanding or expandable anchor fasteners for fastening objects with respect to a wall or the like.

2. Description of the Prior Art

There are a wide variety of anchor fasteners for fastening objects with respect to a wall or the like. The most common of these anchor fasteners is known generally as a spring wing toggle bolt. This type of anchor fastener has a pair of opposed wings which are hingedly connected to each other by a hinge piece having a threaded hole therein. A bolt is positioned through the threaded hole such that the wings can be threadedly moved along the bolt. A wire spring is extended about the hinge to the move the wings to an open position. To use the spring wing toggle bolt the wings are collapsed about the bolt such that the wings and bolt can be inserted through a hole and a wall. Once through the wall the wings spring open and are drawn back against the wall. By tightening the bolt with the wings held against the wall an object connected to the bolt can be anchored to the wall.

In order to make spring wing toggle bolts sufficiently strong to withstand threaded tightening and the leverage placed upon the wings at the hinge point because the wings span the hole in the wall, the wings are generally formed of channel shaped pieces of metal. The channels extend about the bolt when the wings are collapsed to a closed position. The base portion of the wings engage each other when the wings are in an open position and prevent the wings from axially moving beyond an open position as the wings are tightened against the wall.

Spring wing toggle bolts have generally been found to be satisfactory except for a few deficiencies. One of the most important of these deficiencies is the complexity and cost. Because the spring wing toggle bolt has many pieces which must be assembled and because these pieces must be separately formed and fit together with relatively close tolerances they are relatively more expensive than other types of fasteners. Moreover, spring wing toggle bolts can be unsatisfactory for certain uses. For example, when used in connection with gypsum wallboard the channel shaped wings can cut the wallboard weakening the anchorage and can even cause complete failure of the anchorage with very little stress placed on the anchor.

In addition to spring wing toggle bolts there are a wide variety of other types of expansion anchors. Among these are the rawl drive expansion plugs and wedge driven expanding shields. There are also single wing toggle bolts which pivot about a threaded hinge. Generally, however, these devices are as complicated or more complicated than the spring wing toggle bolt and suffer from the same types of deficiencies and problems.

SUMMARY OF THE INVENTION

It is accordingly an object of the present invention to provide an improved expansion anchor.

It is also an object of the present invention to provide an expansion anchor which is simpler and less expensive to manufacture.

Another object of the present invention is to provide an expansion anchor which is less likely to cause failure of the anchor due to cutting of the wall surface or the like.

Yet another object of the present invention is to provide an expansion anchor which is able to provide a stronger anchorage.

In accordance with the objects of the present invention the expansion anchor of the present invention has a unitary anchor formed of a single piece of molded plastic. This anchor consists of a cylindrical body having an axial bore therethrough and first and second axial ends. A wing support member extends from the first end of the cylindrical body and generally has a central cylindrical section shape. The wing support member has first and second opposed planar surfaces extending parallel to a central bore which is co-axial to and extends the axial bore in the cylindrical body. The first and second opposed planar surfaces of the wing support member join perpendicularly with the first axial end of the cylindrical body to form first and second recessed shoulder spaces, respectively, therewith. Formed as a part of the unitary plastic anchor are first and second expanding wing elements. These wing elements have a planar engagement surface which are hingedly connected to the wing support member along the planar surface of the wing support member such that the wing elements are movable from a collapsed, axial position to an open, radial position. The first and second expanding wing elements have shoulders disposed for being received in the recessed shoulder spaces when the first and second expansion wing elements are in their open position. In this manner, the first and second expanding wing elements are supported against axial movement beyond the open radial position by the first radial surface of the wing support element and by the first axial end of the cylindrical body.

The hinged connection between the expanding wing elements and the wing support member are formed of plastic having a plastic memory such that the expanding wing elements are resiliently urged to a position between an open radial position and a collapsed axial position.

Openings are connected to the cylindrical body for extending through the axial bore to connect the cylindrical body to an object through a wall opening. In one embodiment the axial bore is threaded and the bolt means is threadedly received therethrough such that rotation of the bolt means tightens the anchor with respect to an object connected to the bolt means. Thus, the expansion anchor of the present invention can consist of simply a bolt means and the single piece molded anchor described above.

For a further understanding of the present invention and further objects, features and advantages thereof, reference may now be had to the following description taken in conjunction with the accompanying drawings.

DESCRIPTION OF PREFERRED EMBODIMENTS

Figure 1:
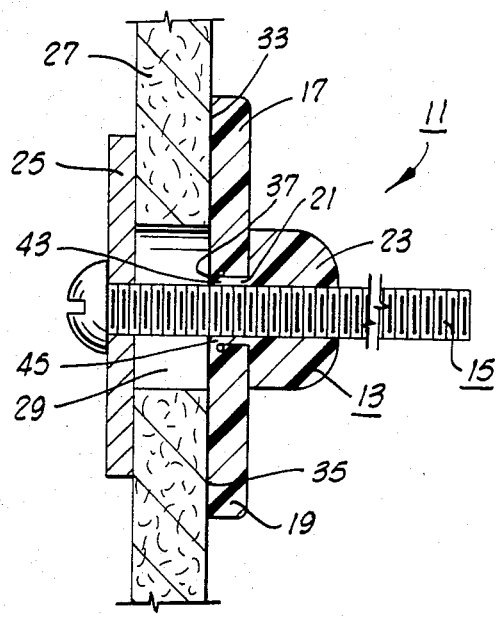
FIG. 1 is a horizontal cross-sectional view of the expansion anchor of the present invention anchoring an object to a wall taken along a central axis of the anchor.

Referring now to FIGS. 1 through 5 the expansion anchor of the present invention is shown generally at 11. The expansion anchor 11 is comprised of two pieces; a plastic anchor piece 13 and a bolt 15. The plastic anchor piece 13 has first and second wings 17 and 19. The wings 17 and 19 are hingedly connected to a wing support member 21. The wing support member 21 extends axially from a cylindrical body 23.

Figure 4:
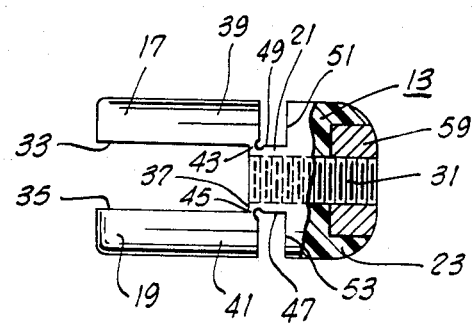
FIG. 4 is a side view of the expansion anchor of the present invention with the wing elements in a collapsed position and having a steel nut in accordance with an alternate embodiment of the present invention.
Figure 5:
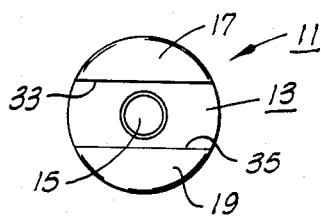
FIG. 5 is a front end view of the expansion anchor of the present invention with the wing elements in a collapsed position.

As shown in FIGS. 1 through 5, especially FIG. 5, the entire anchor piece 13 generally conforms to a right circular cylindrical configuration of the same diameter when the wings 17 and 19 are in a collapsed position. This is important since expansion anchors are usually inserted through cylindrical openings. As shown in FIG. 1, the expansion anchor of the present invention can be utilized to anchor an object 25 to a wall 27 through a cylindrical hole 29 in the wall 27. As will be apparent from the manner in which this invention works, it is desirable to have the cylindrical body 23 just slightly smaller than the hole 29.

Extending through the cylindrical body 23 and the wing support member 21 is a threaded bore 31. The threaded bolt 15 is received in the bore 31 so that rotation of the bolt 15 moves the anchor piece 13 along the bolt 15. Wings 17 and 19 each have a planar wall engagement surface 33 and 35, respectively. When the wings are in a collapsed position (see FIGS. 4 and 5) the wall engagement surfaces 33 and 35 extend axially adjacent to bolt 15. When the wings 17 and 19 are in an open position (see FIGS. 1 and 3) the wall engagement surfaces 33 and 35, together with the axial end 37 of the wing support member 21 form a single planar surface. When anchoring an object as shown in FIG. 1, the outer edges of the wall engagement surfaces 33 and 35 engage the wall surface of a wall 27 and span the wall opening 29.

The outer surfaces 39 and 41 of wings 17 and 19, respectively, have a cylindrical surface section shape of the same diameter as the cylindrical body 23. Because of this configuration the wings 17 and 19 fit through the same diameter hole that the cylindrical body 23 will fit and, has a maximum amount of strength presented to the wall 27 when anchoring an object 25.

Figure 2:
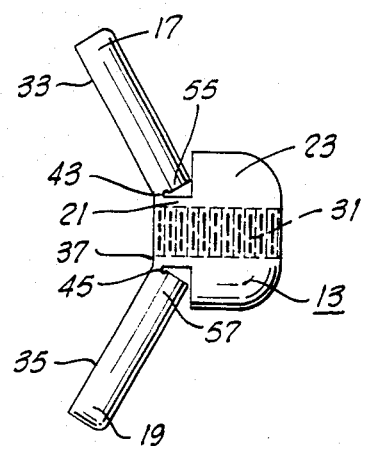
FIG. 2 is a side view of the anchor portion of the present invention with the wing elements in a relaxed position.
Figure 3:
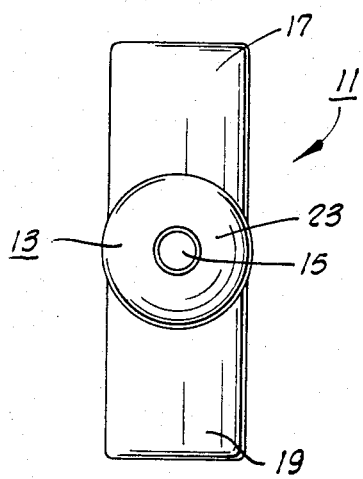
FIG. 3 is a rear view of the expansion anchor of the present invention with the wing elements in an open position.

As shown in FIGS. 1, 2 and 4 wings 17 and 19 are connected to the wing support element 21 by plastic hinges 43 and 45, respectively. These hinges 43 and 45 are located at the end of wall engagement surfaces 33 and 35. The hinges 43 and 45 connect the wall engagement surfaces 33 and 35 to the wing support member 21 at the end 37 of the wing support member 21. The hinges 43 and 45, wings 17 and 19 and the wing support member 21 are all formed of a single piece of plastic.

The wing support member 21 has opposed planar surfaces 47 and 49. These surfaces extend parallel to the axis of bore 31 and perpendicular to walls 51 and 53 which form the radial front end of cylindrical body 13. Together, surfaces 49 and 51 and 47 and 53 form recessed shoulder areas on opposite sides of the cylindrical body 13. The rear ends or base portions 55 and 57 of wings 17 and 19 form shoulders which are received into these recessed shoulder spaces when the wings 17 and 19 are moved to an open position.

When the wings 17 and 19 are in an open, radial position, shoulders 55 and 57 are supported by the surfaces 49 and 47 of the wing support member and the walls 51 and 53 of the cylindrical body 23. The wings 17 and 19 are not able to move axially beyond the open position because of this support and because of the retention of the wings 17 and 19 by the hinges 43 and 45. Because the cylindrical body 23 is just slightly smaller than the wall hole 29, the wings 17 and 19 prevent the body 23 from moving back through hole 29 due to their size and due to their being supported in this radial position.

During the forming of the anchor piece 13 the hinges 43 and 45 are given a plastic memory which resiliently urges the wings 17 and 19 to an intermediate position between the open position and the collapsed position. This position is shown in FIG. 2. This intermediate position holds the wings 17 and 19 far enough apart so that they will engage the wall and spread to an open position after the anchor piece 13 is inserted through an opening 29 in a wall 27.

To utilize the expansion anchor of the present invention the object 25 is first positioned so that bolt 15 extends through and retains the object 25. Next, the anchor piece 13 is threadedly connected to the bolt 15. As with a conventional spring wing toggle bolt, the bolt and anchor piece 13 are then inserted through a hole 29 in a wall 27. Generally, the hole 29 has a diameter which is just barely larger than the diameter of the cylindrical body 23 and the collapsed wings 17 and 19.

As the anchor piece 13 is inserted through the hole 29 the wings 17 and 19 collapse so that the anchor piece will fit therethrough. After the wings 17 and 19 clear the wall 27 they spring open to a relaxed position as shown in FIG. 2 as a result of the plastic memory of hinges 43 and 45. The anchor piece 13 is then drawn back against the wall 27 by bolt 15 such that the wings 17 and 19 encounter the wall 27 and are moved to an open position. With the anchor piece held by friction with the wall from rotation the bolt 15 is rotated to tighten the bolt 15 with respect to the anchor piece 13. Complete tightening of the bolt 15 anchors the object 25 to the wall 27 by means of the anchor piece 13.

FIG. 4 illustrates an anchor piece 13 which is identical to the all-plastic pieces 13 shown in the other figures except including a steel nut 59 embedded in the end of cylindrical body 23. This nut 23 is desirable to give added strength to the body 23 and the threaded connection to bolt 15. The nut 59 can be enclosed during the molding process or attached by glue or the like.

It has been discovered that the expansion anchor of the present invention is stronger than conventional spring wing toggle bolts. In a comparison of a steel spring wing toggle bolt with the plastic anchor piece of the present invention joined to a bolt of the same size and utilizing the same wall material and the same diameter holes, the steel toggle bolt failed at 745 pounds of tension while the plastic anchor piece of the present invention failed at 1130 pounds of tension.

In forming the plastic anchor piece of the present invention standard injection molding techniques, well known to those skilled in the art, are utilized. Also, standard plastic materials, also well known to those skilled in the art are utilized. Various types of plastic materials have different qualities of resiliency and strength and these qualities might be varied for different applications. Thus, an anchor piece for wood might be made of a different type of plastic than an anchor piece for gypsum wallboard.

One reason it is thought that the present invention will be better suited as an anchor fastener is that plastic is more resilient than steel. This allows some "give" as the fastener is stressed. Another reason that the present invention is an improved anchor fastener is that it anchors in a different manner. The present invention utilizes a cylindrical body 23 slightly smaller than wall hole 29. The wings 17 and 19 utilize a unique shoulder-type support to retain the wings in a radial position. The cylindrical body 23, not only provides this shoulder-type support, it also prevents withdrawal of the anchor due to the size of the wings 17 and 19. In other words, with the wings bent over body 23, the wings and body are too large to fit through hole 29.

Still another reason that the present invention has an improved strength capability is that the cylindrical body, the wing support member, and the wings join to form an almost solid presentation with respect to the wall. This is in contrast to the spring wing toggle bolts which present a channel shape structure to the wall which tends to cut the wall.

While the above embodiment is preferred the present invention also contemplates several other embodiments. For example, in one embodiment the bore 31 would not be threaded and a steel or plastic nut would be positioned behind the cylindrical body 23. If desired, this nut could be attached to or received in the body 23 as shown in FIG. 4.

In another embodiment the present invention could be utilized in connection with the invention described in Applicant's separate patent application Ser. No. 178,830 filed Aug. 18, 1980. This would, of course, require a cylindrical side section to be removed from the cylindrical body 23, the wing support member 21, and the wings 17 and 19.

Thus, the expansion anchor of the present invention is well adapted to attain the objects and advantages mentioned as well as those inherent therein. While presently preferred embodiments of the invention have been described for the purpose of this disclosure, numerous changes in the construction and arrangement of parts can be made by those skilled in the art which changes are encompassed within the spirit of this invention as defined by the appended claims.

The foregoing disclosure and the showings made in the drawings are merely illustrative of the principles of this invention and are not to be interpreted in a limiting sense.

What is claimed is:

1. An expanding anchor fastener for use in fastening to a wall having a circular hole of predetermined size comprising:
   a right circular cylindrical body sized to closely fit through a circular hole of predetermined size, said body having an axial bore therethrough and first and second axial ends;
   a wing support member having a longitudinal circular cylindrical segment shape sized to closely fit through a circular hole of predetermined size and having a bore therethrough connected with and coaxial to said axial bore of said cylindrical body, said wing support member having first and second opposed planar surfaces extending parallel to said wing support bore and joining perpendicularly with said first axial end of said cylindrical body to form first and second recessed shoulder spaces, respectively, therewith;
   a first expanding wing element having a longitudinal circular cylindrical segment shape sized to closely fit through a circular hole of predetermined size and having a planar engagement surface foldably connected to said wing support member along said first planar surface of said wing support member such that said expanding wing element is movable from a collapsed, axial position to an open, radial position, said first expanding wing element having a shoulder disposed for being received in said first recessed shoulder space when said first expanding wing element is in an open, radial position such that said first expanding wing element is supported against axial movement beyond said open radial position by said first planar surface of said wing support element and by said first axial end of said cylindrical body;
   a second expanding wing element having a longitudinal circular segment shape and sized to closely fit through a circular hole of predetermined size having a planar engagement surface foldably connected to said wing support member along said second planar surface of said wing support member such that said second expanding wing element is movable from a collapsed, axial position to an open, radial position, said second expanding wing element having a shoulder disposed for being received in said second recessed shoulder space when said second expanding wing element is in an open position such that said second expanding wing element is supported against axial movement beyond said open, radial position by said second planar surface of said wing support element and by said first axial end of said cylindrical body;
   means for resiliently urging said first and second expanding wing elements to a position between said open position and said collapsed position;
   said wing elements when in said collapsed position conforming to a right circular cylindrical configuration of the same diameter as the right circular cylindrical configuration of said body and said wing support member;
   bolt means connected to said cylindrical body for extending through said axial bore to connect said cylindrical body to an object such that said cylindrical body can anchor an object with said first and second wing elements in said open position.

2. The fastener of claim 1 wherein said cylindrical body, said wing support member, and said first and second wing elements are formed of a single piece of plastic and wherein said means for resiliently urging said first and second expanding wing elements comprises plastic hinges having a plastic memory position between said open position and said collapsed position.

3. The fastener of claim 2 wherein said cylindrical body, said wing support member, and said first and second wing elements conform generally to an extended cylindrical shape when said first and second wing elements are disposed in said collapsed position.

4. The fastener of claim 4 wherein said axial bore is threaded and said bolt means is threadedly connected thereto such that an object connected to said cylindrical body can, by said bolt means, be adjustably anchored by rotation of said bolt means.

5. The fastener of claim 1 wherein said first and second wings have a cylindrical section shape providing a maximum of wing strength consistent with the size of said cylindrical body and said planar engagement surface of each of said first and second wing elements.

6. An expanding fastener for use in fastening to a wall having a hole of predetermined size comprising:

a body portion with an axial bore therein for receiving a connecting bolt therethrough and including;

a cylindrical back piece having a right circular cylindrical shape;

a wing support front piece having a longitudinal circular cylindrical segment shape and joining with said cylindrical back piece to form wing support spaces therebetween;

a first expanding wing element having a front surface and a first axial end, said expanding wing element hingedly connected to said wing support front piece at said front surface, such that said expanding wing element is movable from a forward collapsed axial position to an open supported radial position, said expanding wing element having a shoulder extending rearwardly from said hinged portion of said front surface for engaging said wing support spaces such that said expanding wing element is supported both axially and radially when in an open expanded radial position;

a second expanding wing element having a front surface and a first axial end, said expanding wing element hingedly connected to said wing support front piece at said front surface, such that said expanding wing element is movable from a forward collapsed axial position to an open supported radial position, said expanding wing element having a shoulder extending rearwardly from said hinged portion of said front surface for engaging said wing support spaces such that said expanding wing element is supported both axially and radially when in an open expanded radial position;

said front surfaces of said wing elements forming an anchor surface conforming to a wall surface of the like when said wing elements are in an open expanded position;

said body portion, said wing support front piece and said wing elements, when in said collapsed positions, conforming to a right circular cylindrical configuration of the same diameter so as to closely fit through a hole of predetermined size; and means for resiliently urging said first and second expanding wing elements to a position between said expanded radial position and said collapsed axial position.

7. The fastener of claim 6 wherein said cylindrical back piece and wing support front piece, said hinges, and said first and second expanding wing elements are formed of a single piece of plastic.

8. The fastener of claim 6 wherein said plastic hinges resiliently urge said first and second expanding wing elements to a plastic memory position between said open position and said collapsed position.

9. The fastener of claim 6 wherein said first and second expanding wing elements have a cylindrical section shape and a diameter substantially equal to the size of said body portion when said first and second expanding wings are in a collapsed position for providing maximum fastening strength for a given body size.

* * * * *